(12) United States Patent
Sakai et al.

(10) Patent No.: US 7,213,687 B2
(45) Date of Patent: May 8, 2007

(54) EMERGENCY BRAKING APPARATUS FOR VEHICLE

(75) Inventors: Moriharu Sakai, Kariya (JP); Takashi Watanabe, Kariya (JP); Shoichi Masaki, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/517,062

(22) PCT Filed: Sep. 29, 2003

(86) PCT No.: PCT/JP03/12441

§ 371 (c)(1),
(2), (4) Date: Dec. 3, 2004

(87) PCT Pub. No.: WO2004/031009

PCT Pub. Date: Apr. 15, 2004

(65) Prior Publication Data

US 2005/0162012 A1    Jul. 28, 2005

(30) Foreign Application Priority Data

Oct. 4, 2002    (JP)    ............................. 2002-291983

(51) Int. Cl.
*B60T 1/12*    (2006.01)
(52) U.S. Cl. ............................. 188/4 R; 188/5; 303/193
(58) Field of Classification Search ................. 188/4 R, 188/5, 6; 303/1, 2, 193; 280/757; 291/2, 291/3; 180/169
See application file for complete search history.

(56) References Cited

U.S. PATENT DOCUMENTS 3,292,738 A * 12/1966 Bernert et al. .................. 188/6
3,799,293 A * 3/1974 Howells et al. ................. 188/5
4,095,551 A * 6/1978 Paul et al. .................. 116/35 R (Continued)

FOREIGN PATENT DOCUMENTS

CN    2464589 Y    12/2001

(Continued)

OTHER PUBLICATIONS

German Patent Office. German Examination Report dated Nov. 16, 2005. German Application No. 103 93 012.4-21. Applicant: Advics Co., Ltd. German Language Translation. 4 pages.

(Continued)

*Primary Examiner*—Thomas Williams
(74) *Attorney, Agent, or Firm*—Buchanan Ingersoll & Rooney PC

(57) ABSTRACT

A vehicle emergency brake system has a second brake for braking a vehicle by increasing the frictional resistance with the road surface, a millimeter wave radar for detecting any obstacle in an advancing direction, a pedal speed sensor for detecting the step-in speed of a brake pedal for actuating a first brake, and a controller for actuating the second brake. If hard braking by the first brake is detected by the pedal speed sensor, the controller determines whether the vehicle is going to crash into an obstacle detected by the radar. If a determination is made that it will collide, the second brake is actuated. Thus, it is possible to reliably actuate the second brake in an emergency.

5 Claims, 6 Drawing Sheets

U.S. PATENT DOCUMENTS

| | | | | |
|---|---|---|---|---|
| 4,613,015 | A | * | 9/1986 | Skrzypek ........................ 188/6 |
| 5,590,937 | A | * | 1/1997 | Heibel ......................... 303/125 |
| 6,084,508 | A | | 7/2000 | Mai et al. |
| 6,447,009 | B1 | * | 9/2002 | McMillan ................... 188/4 R |
| 6,732,969 | B2 | * | 5/2004 | Tanji et al. ................ 242/384.1 |
| 7,035,735 | B2 | * | 4/2006 | Knoop et al. ................ 180/169 |
| 2002/0066818 | A1 | | 6/2002 | Tanji et al. |

FOREIGN PATENT DOCUMENTS

| | | | |
|---|---|---|---|
| DE | 198 23 228 A1 | | 12/1999 |
| DE | 199 33 183 A1 | | 1/2001 |
| DE | 197 38 611 A1 | | 1/2006 |
| GB | 2282499 A | * | 4/1995 |
| JP | 49-002228 | | 1/1974 |
| JP | 49-2228 | | 1/1974 |
| JP | 50-100703 | | 8/1975 |
| JP | 54-122528 | | 9/1979 |
| JP | 54-122528 A | | 9/1979 |
| JP | 63-002706 A | | 1/1988 |
| JP | 04-038204 A | | 2/1992 |
| JP | 06-286586 A | | 10/1994 |
| JP | 06321075 A | * | 11/1994 |
| JP | 07-309101 A | | 11/1995 |
| JP | 08-025905 A | | 1/1996 |
| JP | 08-040222 A | | 2/1996 |
| JP | 10-329697 A | | 12/1998 |

OTHER PUBLICATIONS

Chinese Patent Office. Chinese Examination Report dated Apr. 7, 2006. Chinese Application No. 038179555. Chinese Language Translation. 4 pages.

* cited by examiner

EMERGENCY BRAKING APPARATUS FOR VEHICLE

TECHNICAL FIELD

The present invention relates to a vehicle emergency brake system for urgently avoiding collision of the vehicle.

BACKGROUND ART

When a vehicle is traveling on a road surface having a low friction coefficient, such as a frozen road, a wet paved road, or a dry paved road where sand is disposed, the grip of the tires with respect to the road surface falls, so that the wheels tend to slip. Thus, heretofore, with a brake system for braking the rotation of wheels mounted on the vehicle (first brake), even if hard braking is activated, the braking distance may increase excessively so that the vehicle may collide against an obstacle, irrespective of whether the vehicle is traveling at a high speed or a low speed.

On a road surface having such a low friction coefficient, since the degrees of slipping tend to be uneven for individual wheels, travel of the vehicle tends to be unstable, so that the vehicle may collide against an obstacle in an oblique direction. As means for allowing stable travel of a vehicle, such systems as an ABS (Antilock Brake System), which detects the degree of slip for every wheel and controls the braking force of each wheel, and VSC (Vehicle Stability Control) for controlling the engine output and the braking force of the wheels by detecting the steering tendency of the vehicle with a yaw rate sensor and a lateral acceleration sensor are used practically. But in order for these systems to operate effectively, it is a prerequisite that the grip of the tires remain to a certain extent.

In order to avoid collision of a vehicle on a road surface having a low friction coefficient as mentioned above, apart from a conventional brake system, it is proposed to mount a second brake for braking the vehicle in a short distance by increasing the frictional resistance with the road surface. As the second brake, there are ones which spray slip-preventive materials such as sand and ice particles between the tires and the road surface (See for example patent documents 1 through 3.), ones in which a liquid adhesive is applied to the tire surfaces to stick slip preventive materials to the tires (See for example patent document 4.), ones in which thawing of the frozen road is prevented by blowing cold air on the tires (See for example patent document 5.), ones in which a braking plate or a toothed braking wheel is pressed against the road surface (See for example patent documents 6 through 8.), and ones in which the pressing force of the vehicle against the road surface is increased by inflating a gas bag outwardly of the vehicle (See for example patent document 9.), etc. (patent document 1; unexamined JP patent publication 4-38204, patent document 2; unexamined JP patent publication 7-309101, patent document 3; unexamined JP patent publication 8-25905, patent document 4; unexamined JP patent publication 63-2706, patent document 5; unexamined JP patent publication 50-100703, patent document 6; unexamined JP patent publication 49-2228, patent document 7; unexamined JP patent publication 54-122528, patent document 8; unexamined JP patent publication 8-40222, patent document 9 unexamined JP patent publication 6-286586.)

DISCLOSURE OF THE INVENTION

Once the above-described second brake is actuated, it takes a long time until it returns to normal, or it can never return to normal. Thus, it is desired to avoid unnecessary actuation and to actuate it only in an emergency where its actuation is indeed necessary. Therefore, an object of the present invention is to provide an vehicle emergency brake system which can accurately actuate the second brake.

In order to solve the above object, the vehicle emergency brake system comprises a first brake for braking the rotation of a wheel, a second brake for braking the vehicle by increasing frictional resistance with a road surface, an obstacle detector means for detecting an obstacle existing in an advancing direction, and a controllercontroller for determining whether or not the vehicle is going to crash into an obstacle detected by said obstacle detector means by a vehicle speed and deceleration detector, wherein when it is determined that the vehicle is going to crash by said controllercontroller, said second brake is actuated.

As the obstacle detector means, it is possible to employ a method in which reflective waves off an obstacle of a laser, visible light, infrared beams, millimeter waves, radio waves, electromagnetic waves such as magnetism, or elastic waves such as ultrasonic waves, or something generated by the obstacle itself are detected by a sensor, a radar, a TV camera, etc., a method in which emission waves of such electromagnetic waves or elastic waves are beacons, a method in which incoming waves are stereo-viewed or image-processed, or a method in which the GPS (Global Positioning System) or VICS (Vehicle Information Communication System) is used.

As the controller, it is possible to use a method in which calculation is made as to whether or not the vehicle is going to crash into an obstacle detected by the obstacle detector means from the distance between the obstacle and the vehicle and the vehicle speed and acceleration or deceleration.

A hard braking detector for detecting the actuation of hard braking by said first brake or actuation requirements for hard braking by a driver may be provided so that if said actuation of hard braking or said actuation requirements are detected, determination is made on whether or not the vehicle is going to crash by said controller. Thus, it is possible to reliably actuate the second brake in an emergency.

The vehicle emergency brake system may further comprise a hard braking booster for automatically boosting hard braking carried out by a driver through said first brake so that if it is determined that the vehicle is crashing into an obstacle by said controller, said hard braking booster is actuated, and if it is determined that the vehicle is still going to crash into the obstacle, said second brake is actuated. Using the hard braking booster, it is possible to reduce situations in which actuation of the second brake is necessary.

In an arrangement wherein said second brake may comprise a plurality of different types, wherein a road surface condition detector for detecting the condition of a road surface is provided, and wherein according to the road surface condition detected by the road surface condition detector, said second brake is selected from among the plurality of different types, it is possible to actuate a more effective type of second brake according to the road surface condition.

That is, for example, a second brake of the type that sprays sand between a tire and a road surface is effective for a frozen road, but on a dry paved road where sand is disposed, it rather promotes slip of wheels. Thus, by mounting a plurality of different types of brake means, and selectively using them, the second brake can be effectively actuated according to various road surface conditions.

As the road surface condition detector, as with the ones described in JP patent publications 7-112659 and 2002-120709, it is possible to employ a method in which the road surface condition is indirectly inferred from the relation between the total sum of the slip values of the individual wheels and the vehicle acceleration, or from the frequency response of transmission characteristics from road surface disturbance to wheel speeds, or a method in which the road surface condition is directly observed with e.g. a TV camera.

In an arrangement in which after the second brake have been actuated, if there is no actuation of hard braking by said first brake, and determination is made that crashing of the vehicle into the obstacle will be avoided by said controller, or if determination is made that the vehicle is at a stop, actuation of said second brake is stopped, it is possible to save redundant use of slip preventive materials such as sand and ice particles or cold air blown against a tire during actuation of the second brake.

By producing an alarm sound when said second brake is actuated, the driver and passengers can prepare themselves for e.g. collision during actuation of the second brake. The alarm sound should be stopped when determination is made that collision of the vehicle has been avoided or when the actuation of the second brake has stopped.

Since the vehicle emergency brake system comprises a first brake for braking the rotation of a wheel, a second brake for braking the vehicle by increasing frictional resistance with a road surface, an obstacle detector means for detecting an obstacle in an advancing direction, and a controller for determining whether or not the vehicle is going to crash into an obstacle detected by said obstacle detector means by a vehicle speed and deceleration detector, wherein when it is determined that the vehicle is going to crash by said controller, said second brake is actuated, it is possible to reliably actuate the second brake in an emergency and avoid unnecessary actuation of the second brake, which takes time to return to normal.

A hard braking detector for detecting the actuation of hard braking by said first brake or actuation requirements for hard braking by a driver may be provided so that if said actuation of hard braking or said actuation requirements are detected, determination is made on whether or not the vehicle is going to crash by said controller. Thus, it is possible to reliably actuate the second brake in an emergency.

The vehicle emergency brake system may further comprise a hard braking booster for automatically boosting hard braking carried out by a driver through said first brake so that if it is determined that the vehicle is crashing into an obstacle by said controller, said hard braking booster is actuated, and if it is determined that the vehicle is still going to crash into the obstacle, said second brake is actuated. Using the hard braking booster, it is possible to reduce situations in which actuation of the second brake is necessary.

In an arrangement wherein said second brake may comprise a plurality of different types of brake means, wherein a road surface condition detector for detecting the condition of a road surface is provided, and wherein according to the road surface condition detected by the road surface condition detector, said second brake is selected from among the plurality of different types of brake means, it is possible to actuate a more effective type of second brake according to the road surface condition.

In an arrangement in which after the second brake have been actuated, if hard braking by said first brake is not actuated, and determination by the controller is made that crashing of the vehicle into the obstacle will be avoided, or if determination is made that the vehicle is at a stop, actuation of said second brake is stopped, it is possible to save redundant use of slip preventive materials such as sand and ice particles or cold air blown against a tire during actuation of the second brake.

By producing an alarm sound when said second brake is actuated, the driver and passengers can prepare themselves for e.g. collision during actuation of the second brake.

BEST MODE FOR EMBODYING THE INVENTION

Figure 1:
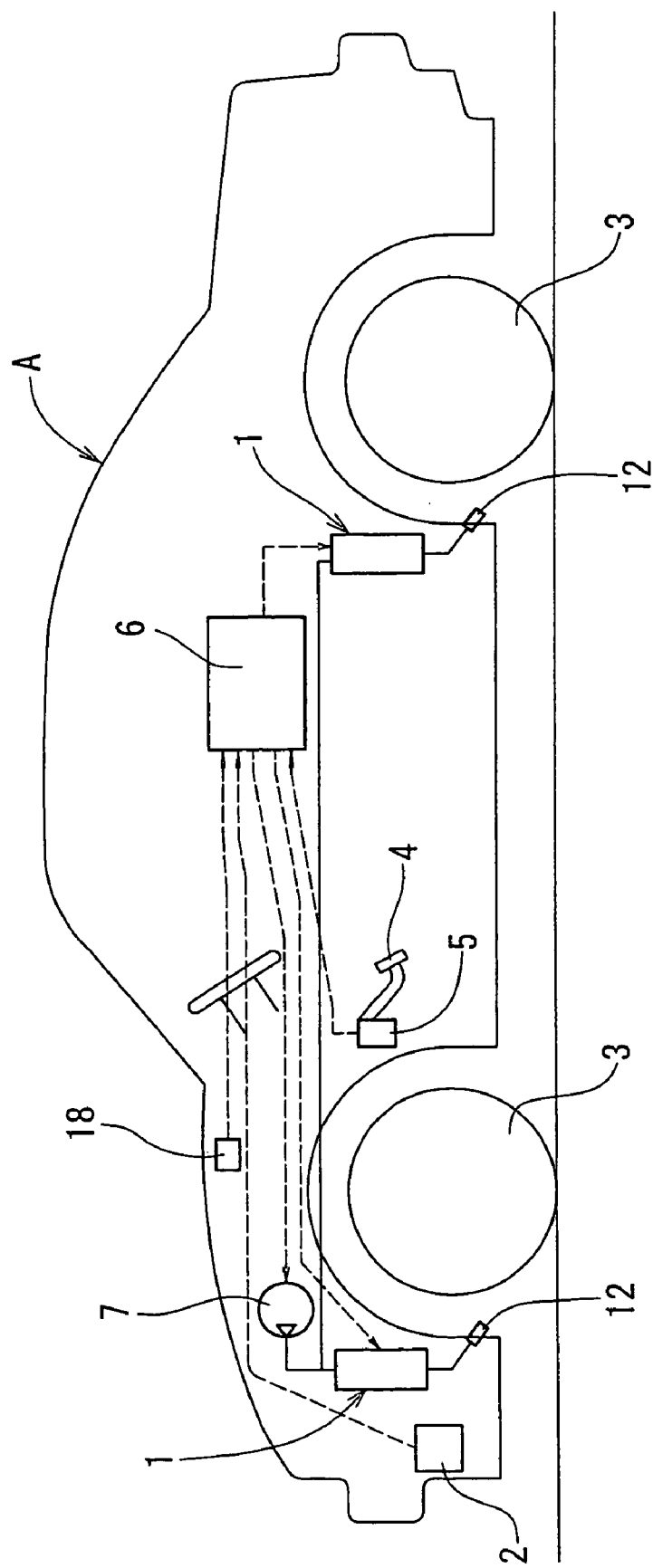
FIG. 1 is a schematic structural view of a vehicle on which is mounted a vehicle emergency brake system of a first embodiment.
Figure 2:
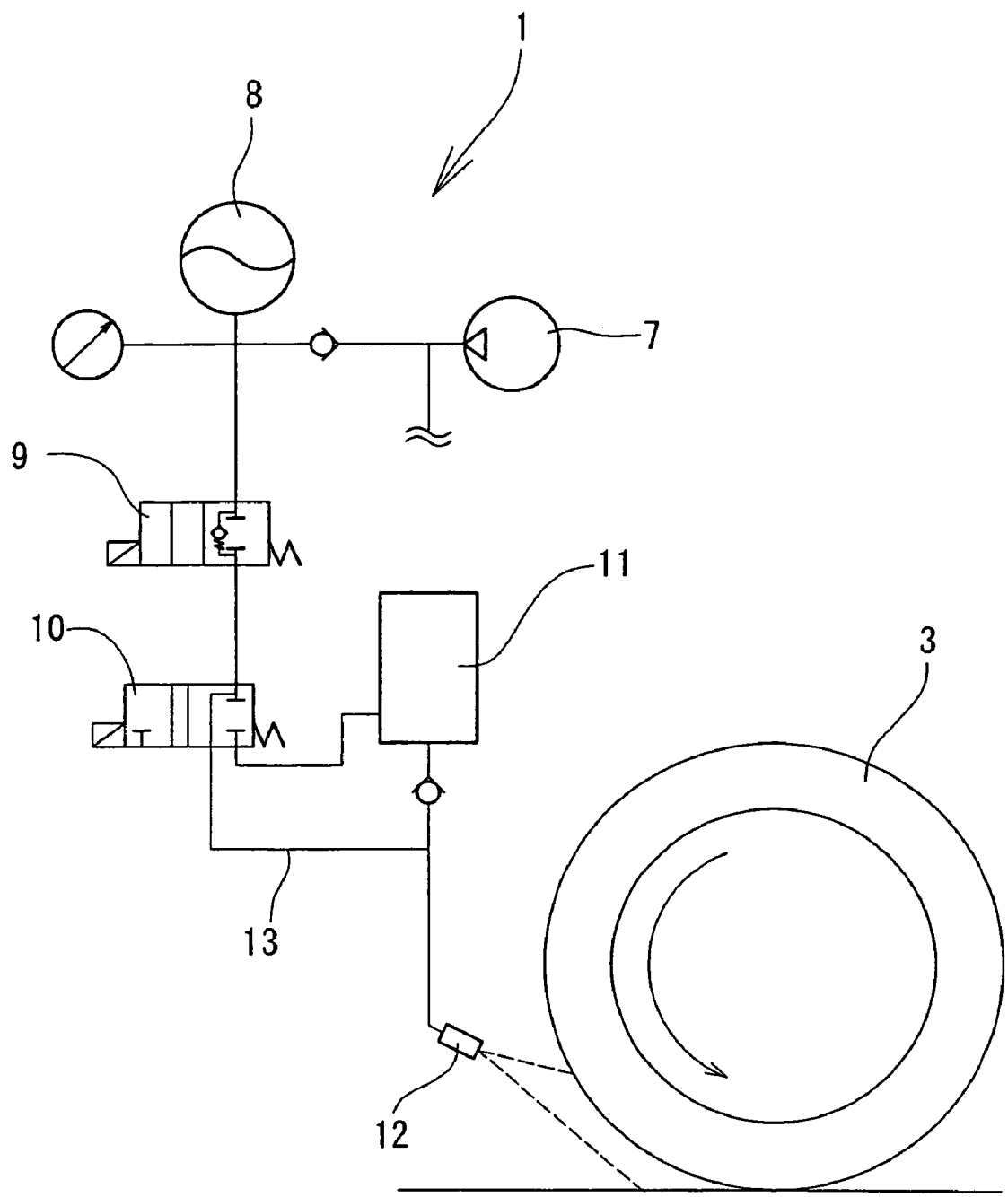
FIG. 2 is a schematic structural view showing a second brake of FIG. 1.
Figure 3:
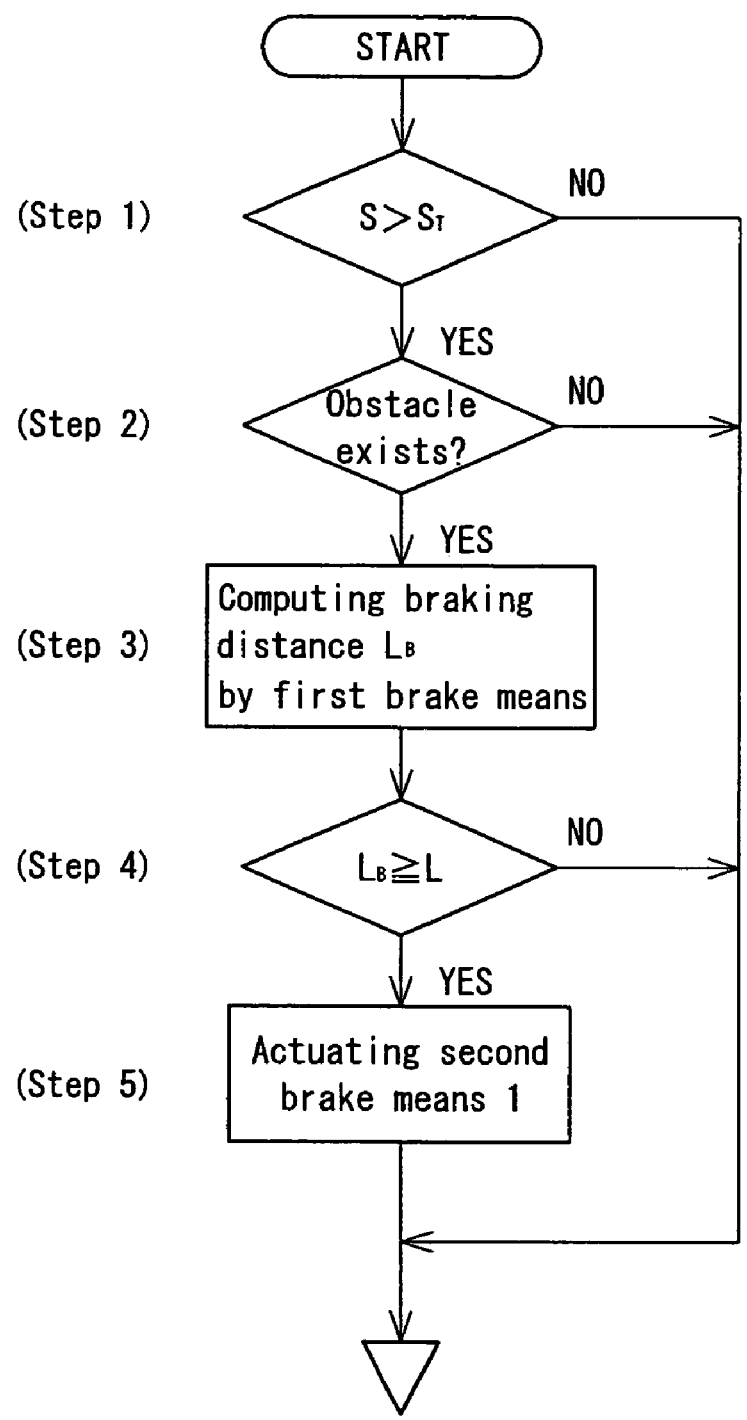
FIG. 3 is a flowchart showing an algorithm for actuating the vehicle emergency brake system of FIG. 1.

Below, based on FIGS. 1 through 6, the embodiments of this invention are described. FIGS. 1 through 3 shows the first embodiment. As shown in FIG. 1, this vehicle emergency brake system comprises a second brake 1 for increasing the frictional resistance with the road surface by spraying a slip preventive material between the tires and the road surface, a radar 2 using millimeter waves for detecting any obstacle in front of the vehicle A, a pedal speed sensor 5 for detecting the step-in speed of a brake pedal 4 for actuating a first brake (not shown) for braking the rotation of the respective wheels 3, and a controller 6 for determining whether or not the vehicle A is going to crash into an obstacle detected by the radar 2 if hard braking by the first brake is activated, and if determined that it will do, activating the second brake 1.

In the controller 6, the distance L to the obstacle, which is detected by the radar 2, and the step-in speed S of the brake pedal 4, which is detected by the pedal speed sensor 5, are input. A threshold ST of the step-in speed 5, which is used as a reference for determination of hard braking of the first brake, is preset. While not shown, the vehicle speed V as detected by a vehicle speed sensor and the vehicle acceleration ? as detected by a vehicle acceleration sensor 18 are also input in the controller 6.

As shown in FIG. 2, the second brake 1 accumulates gas in an accumulator 8 with a pump 7, supplies the accumulated gas into a spray material container 11 in which is stored a slip preventive material through two solenoid valves 9 and 10, opens the respective solenoid valves 9 and 10 under the command from the controller 6 to spray the slip preventive material through a nozzle 12 provided in front of one of the wheels 3. A bypass path 13 provided between the solenoid valve 10 and the nozzle 12 is provided for a test in which confirmation is made that the nozzle 12 is not clogged and the second brake 1 operates normally, by blowing gas only through the nozzle 12. While not shown, the solenoid valves 9 and 10, the spray material container 11 and the nozzle 12 are provided for each wheel 3. They may be provided only on the front wheel side, where the braking effect is large.

FIG. 3 is a flowchart showing the algorithm of the controller 6, which activates the vehicle emergency brake system. First, the controller 6 compares the step-in speed 5, which is input from the pedal speed sensor 5 at short intervals, with the preset threshold ST (Step 1), and if the step-in speed S exceeds the threshold ST, it further checks if there is any obstacle on the radar 2 (Step 2), and if there is an obstacle, it calculates the braking distance LB by the first brake from the vehicle speed V and the vehicle acceleration (deceleration) a, which are input from the vehicle speed sensor and the vehicle acceleration sensor 18, respectively, by the following formula (Step 3).

$$LB = V2/(2?) \qquad (1)$$

In Formula (1), the braking distance LB is calculated with the deceleration by hard braking as a constant deceleration ?. The braking characteristics by the first brake may be grasped beforehand so as to correct the braking distance LB, which is calculated by Formula (1), based on the braking characteristics.

Next, the calculated braking distance LB is compared with the distance L to the obstacle detected by the radar 2 (Step 4), and if the braking distance LB exceeds the distance L to the obstacle, it determines that the vehicle is going to crash into the obstacle. Thus, it opens the solenoid valves 9 and 10 to actuate the second brake 1 (Step 5).

In this embodiment, actuation of hard braking by the first brake is a prerequisite for actuating the second brake. But if actuation requirements of hard braking by the driver are a prerequisite, there is a case in which no deceleration has started yet, and thus the estimation of braking distance LB is impossible. In such a case, if for example the output of a sensor for detecting actuation requirements for hard braking exceeds a predetermined threshold, it preferably unconditionally determines that the vehicle is going to crash into the obstacle and activates only the second brake 1. In this determination, the distance L to the obstacle L and/or the vehicle speed V may be additionally taken into consideration.

Figure 4:
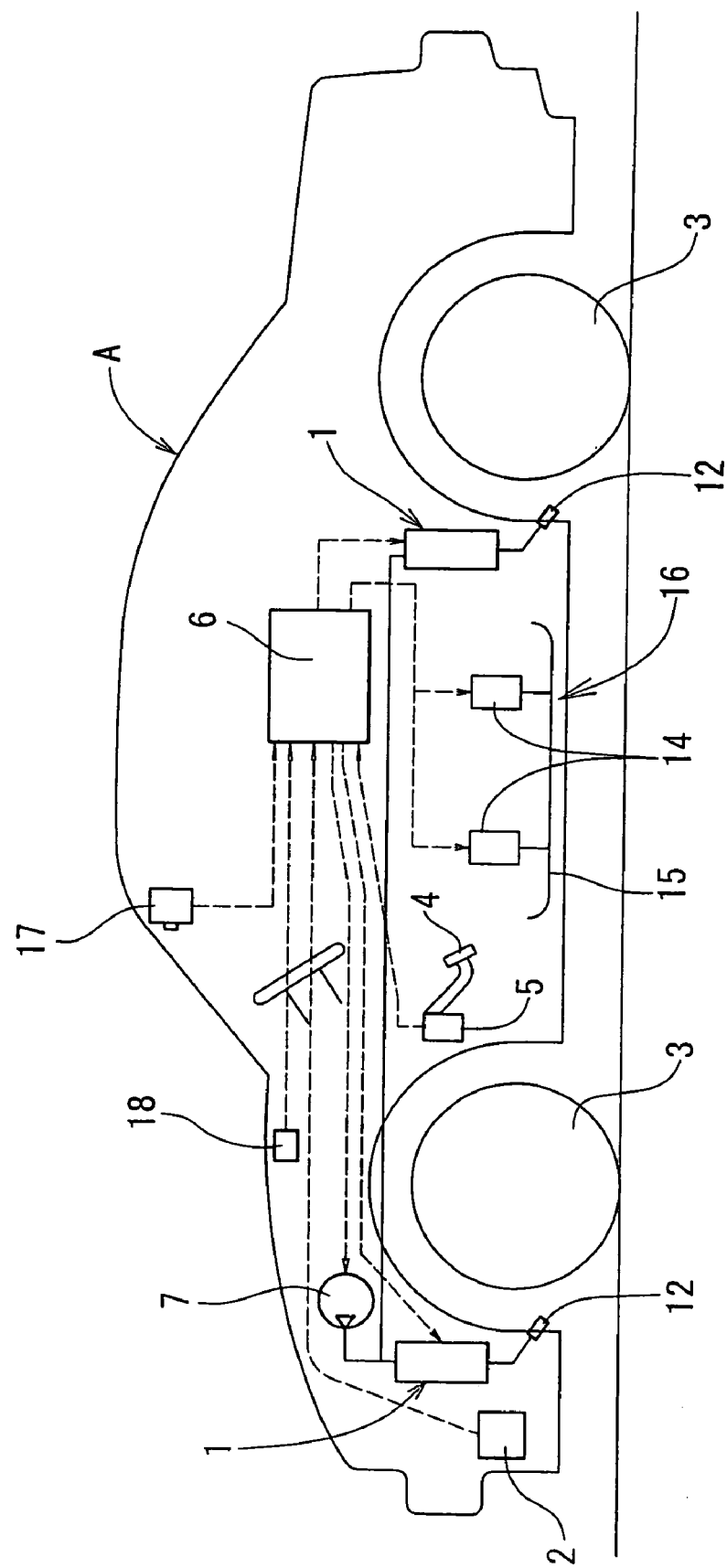
FIG. 4 is a schematic structural view of a vehicle on which is mounted a vehicle emergency brake system of a second embodiment.
Figure 5:
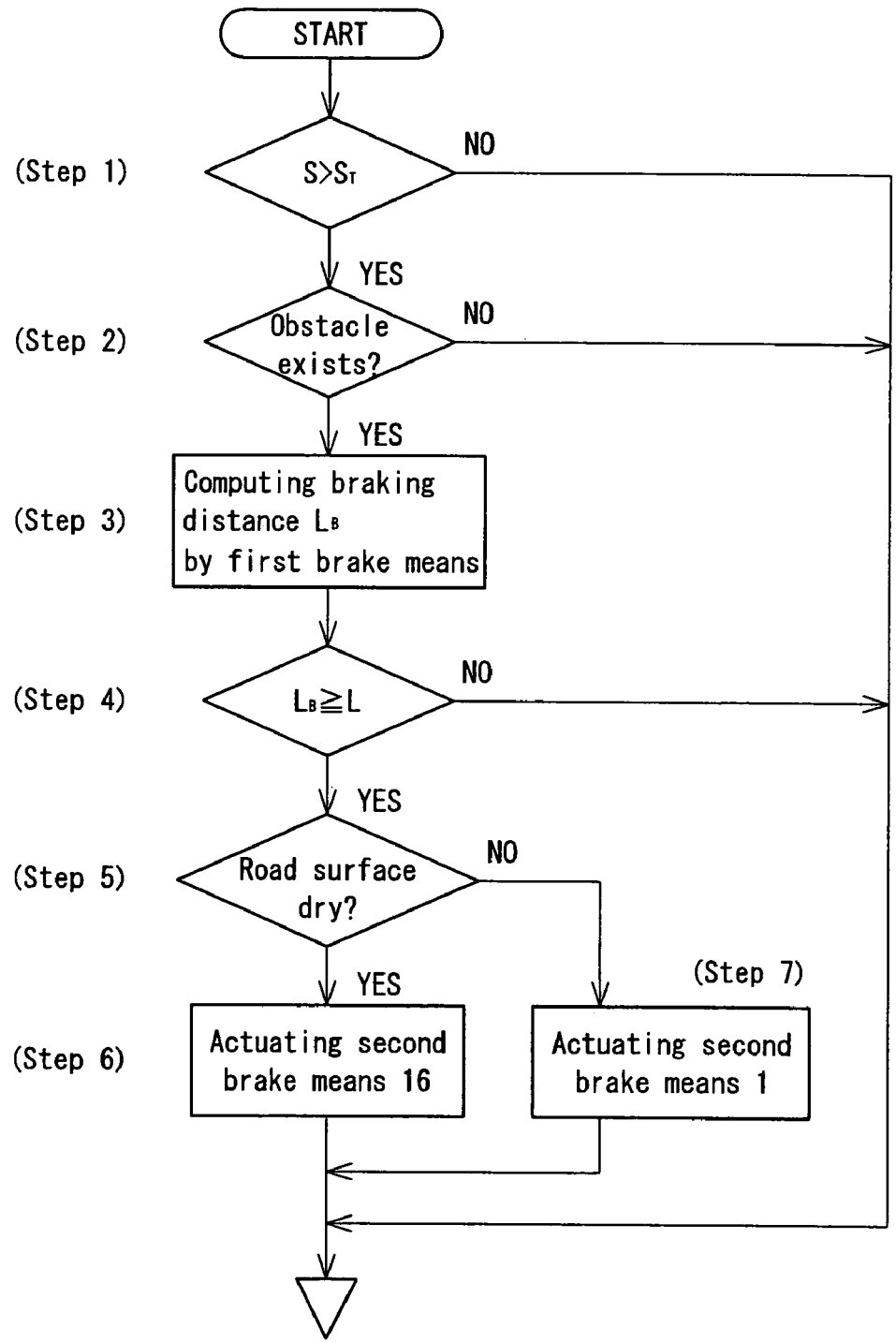
FIG. 5 is a flowchart showing an algorithm for actuating the vehicle emergency brake system of FIG. 4.

FIGS. 4 and 5 show the second embodiment. As shown in FIG. 4, this vehicle emergency brake system is provided, besides the elements of the first embodiment, with a second brake 16 for pressing a braking plate 15 against the road surface with a cylinder 14, and a TV camera 17 for observing the road surface condition in front of the vehicle A. According to the road surface condition observed by the TV camera 17, the second brake 1 for spraying the slip preventive material and the second brake 16 for pressing the braking plate 15 against the road surface are selectively actuated by the controller 6.

The controller 6 determines from the road surface images picked up by the TV camera 17 whether the road surface is frozen, wet or dry. As described above, the road surface condition may be indirectly inferred from the relation between the sum of the slip values of the respective wheels and the vehicle acceleration, or frequency response of transmission characteristics from road surface disturbance to the wheel speeds.

FIG. 5 is a flowchart showing the algorithm of the controller 6, which actuates the above vehicle emergency brake system. As with the one of the first embodiment, first, the controller 6 compares the step-in speed 5, which is input from the pedal speed sensor 5 at short intervals, with the threshold ST (Step 1), and if the step-in speed S exceeds the threshold ST, it further checks if there is any obstacle on the radar 2 (Step 2), and if there is an obstacle, it calculates the braking distance LB by the first brake from the vehicle speed V and the vehicle acceleration (deceleration) a by Formula (1). The calculated braking distance LB is compared with the distance L to the obstacle (Step 4).

If the braking distance LB exceeds the distance L to the obstacle, it determines if the road surface shot by the TV camera 17 is dry or otherwise (Step 5), and if it determines that the road surface is dry, the second brake 16 for pressing the braking plate 15 is actuated (Step 6). Otherwise, the second brake 1 for spraying the slip preventive material is actuated (Step 7).

While not shown, in the vehicle emergency brake system of the third embodiment, in the controller 6 of the first embodiment, which is shown in FIG. 1, a brake assist system as a hard braking boosting means for automatically boosting hard braking carried out by the driver through the first brake is mounted, and if the braking distance LB calculated by Formula (1) exceeds the distance L to the obstacle detected by the radar 2, the brake assist system is actuated first, and if it still determines that the vehicle A is going to crash into the obstacle, the second brake 1 is actuated.

Figure 6:
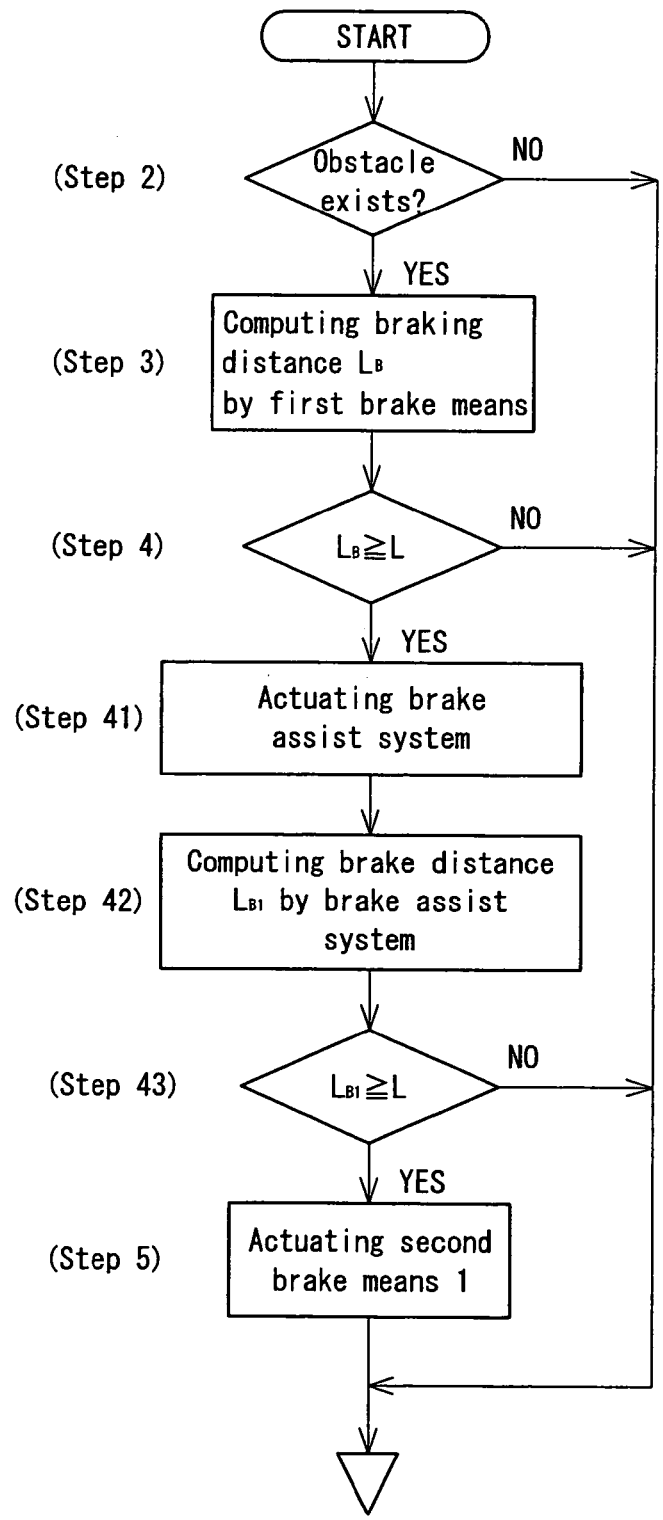
FIG. 6 is a flowchart showing an algorithm for actuating a vehicle emergency brake system of a third embodiment.

FIG. 6 is a flowchart showing the algorithm of the controller 6 for actuating the vehicle emergency brake system of the third embodiment. In this flowchart, Step 1 in the first embodiment of FIG. 3 is omitted, and Step 41 for actuating the brake assist system, Step 42 for calculating the braking distance LB1 by the brake assist system, and Step 43 for comparing the braking distance LB1 with the distance L to the obstacle detected by the radar 2 are provided in the YES path between Step 4 and Step 5 to actuate the second brake 1 if the braking distance LBL exceeds the distance L to the obstacle.

If the hard braking booster such as the brake assist system is provided, steps for actuating the hard braking booster may be provided between the YES path between Step 1 and Step 2 in the flowchart of the first embodiment, shown in FIG. 3 so as to make determination on vehicle collision by calculating the braking distance LB by boosted hard braking of the first brake and comparing it with the distance L to the obstacle.

In the above embodiments, as the obstacle detector means, a millimeter wave radar was used, and as the hard braking detector, a pedal speed sensor for the brake pedal was used. But these obstacle detector means and hard braking detector are not limited to those of the embodiment, but various methods as described above can be employed. For the second brake, too, anything that can increase the frictional resistance with the road surface may be used. That is, the above-described various means can be employed.

The invention claimed is:

1. An emergency brake system for a vehicle comprising:
a first brake for braking the rotation of a wheel;
a second brake for braking the vehicle by increasing frictional resistance with a road surface;
an obstacle detector for detecting an obstacle existing in an advancing direction of the vehicle;
a vehicle speed and deceleration detector for detecting the speed and deceleration of the vehicle;
a hard braking detector for detecting the actuation of hard braking by said first brake or actuation requirements for hard braking by a driver; and
a controller for determining whether or not the vehicle is going to crash into the obstacle detected by said obstacle detector based on the speed and deceleration detected by said vehicle speed and deceleration detector, after the actuation of hard braking or the actuation requirements have been detected by said hard braking detector;

wherein said second brake is actuated if said controller determines that the vehicle is going to crash into the obstacle detected by said obstacle detector.

2. An emergency brake system for a vehicle as claimed in claim 1 further comprising a hard braking booster for automatically boosting hard braking carried out by a driver through said first brake, wherein if it is determined that the vehicle is going to crash into an obstacle by said controller, said hard braking booster is actuated, and if it is determined that the vehicle is still going to crash into the obstacle after actuation of the hard braking booster, said second brake is actuated.

3. An emergency brake system for a vehicle as claimed in claim 1 wherein said second brake comprises a plurality of different types of brakes, wherein a road surface condition detector for detecting the condition of a road surface is provided, and wherein according to the road surface condition detected by the road surface condition detector, said second brake is selected from among the plurality of different types of brakes.

4. An emergency brake system for a vehicle as claimed in claim 1 wherein after the second brake have been actuated, if hard braking by said first brake is not actuated, and determination by said controller is made that crashing of the vehicle into the obstacle will be avoided or if determination is made that the vehicle is at a stop, actuation of the second brake is stopped.

5. An emergency brake system for a vehicle as claimed in claim 1 wherein an alarm sound is produced when said second brake is actuated.

* * * * *